Patented June 1, 1926.

1,587,057

UNITED STATES PATENT OFFICE.

WILLIAM W. WINSHIP, OF FREEPORT, NEW YORK, ASSIGNOR TO THE THERMAL SYNDICATE LTD., OF BROOKLYN, NEW YORK, A CORPORATION OF ENGLAND.

COMPOSITION OF MATTER AND METHOD FOR MAKING THE SAME.

No Drawing.   Application filed May 8, 1925. Serial No. 28,974.

This invention relates to a composition of matter and a method for making the same. More particularly the invention comprises a composite product from fused silica or fused quartz and a method for the production thereof.

As is well known silica exists in a large variety of forms having very different properties. Ordinary sand, for example, is silicon dioxide or silica, $SiO_2$, and is a crystalline form thereof. Ordinary quartz, also known as rock crystal, is a crystalline rhombohedral form of silica having substantially the same properties as ordinary sand.

It has been found that when quartz is fused in the oxyhydrogen flame or in the electric furnace, and cooled, a material is obtained of the same composition as quartz but having widely different physical properties, the resultant material having very low coefficient of expansion and can therefore be heated or cooled as suddenly as desired without risk of fracture. It is apparent that the new physical properties result from a change in physical state, the material being it is generally assumed, in the form of a supercooled liquid.

I have found that by treating fused quartz according to the method hereinafter fully disclosed a product is obtained which, while retaining the desirable characteristics of low expansion with heat and high dielectric strength, possesses certain valuable properties differing from those of the original fused quartz whereby it is adapted for a variety of uses for which the original material cannot be employed.

Fused quartz or fused silica has become, during recent years, an important article of commerce being employed for chemical equipment, electrical apparatus, and for articles of all kinds in which the material is subjected to extreme temperature changes. The various articles made from fused silica frequently become broken and are merely thrown to waste, no commercial means having been devised for utilizing such broken fused quartz material.

The present invention has for an object the utilization of waste or crushed fused silica or fused quartz by the production of a new and useful product therefrom.

Another object of the invention is to provide a process whereby the fused quartz or fused silica may be treated to attain the desired product.

With these and other objects in view the invention comprises the various features hereinafter more fully described and particularly defined in the claims.

In order to carry out my invention, I preferably comminute fused silica or fused quartz to a suitable state of sub-division, either by grinding, or crushing, or by any other suitable method. This ground fused silica is then mixed with a sufficient amount of a sodium silicate solution, so as to form a stiff paste, and is then molded into any desired form, for the production of plates, rods, bricks or other articles to be made therefrom. I preferably employ equal proportions by weight of pure ground fused silica of 20 and 150 mesh fineness and admix therewith a solution of sodium silicate.

Various forms of solutions are suitable for my purpose, the particular strength or form of solution to be employed depending on the state of sub-division of the fused quartz or fused silica employed and also upon the particular results desired, as for example, where certain particular properties are desired in the final product which is to be applied to a special use, or depending upon other factors as will be apparent to those skilled in the art. I may employ a saturated solution of sodium silicate, for example, although I preferably employ a solution having the following composition which I have found best suited for my purpose.

|  | Per cent. |
|---|---|
| $SiO_2$ | 24.7 |
| $Na_2O$ | 6.4 |
| $H_2O$ | 68.9 |

The above composition corresponds substantially to a saturated solution of water glass ($Na_2Si_4O_9$) and has a gravity of about 37° Baumé at 68° F. It is to be understood, however, that this composition as above set forth, is given only for purposes of illustrating the composition which I have found best suited under ordinary conditions for the production of my product and that I do not desire to be limited to this composition. Any solution having an equivalent action, such as a solution of the above composition which has been diluted or a solution in which the ratio of $SiO_2$ to $Na_2O$ is less than the above, or a solution in which potassium silicate is substituted as a whole or in part for sodium silicate, may be employed in place of the above.

The amount of the silicate solution which is to be employed in admixture with the fused silica or, in other words, the proportion of solution to the dry powdered material, will vary with the fineness of grinding of the silica material and upon the proportions of the various grades of fineness of the fused silica which is employed. The requisite or suitable amount of solution for a given amount of fused silica material may be readily determined by means of a trial sample, as will be apparent to those skilled in the art, or the amount may be readily determined if desired, through observation or tests during the mixing process of the solution with the ground silica material. While I prefer to carry out my invention by mixing the powdered fused silica or quartz material of the grades of fineness, as above set forth, it is obvious that powdered material of other grades may be employed or a mixture of a number of different grades may be used, if desired. On the other hand, I may employ for special purposes, fused silica or quartz powder of a single grade of fineness as, for example, where uniformity of structure in the material is desired.

After the silica material and silicate solution have been properly mixed to form a paste of the desired consistency, the material is transferred to a suitable mold or molds, whereby the material is shaped into whatever form is desired in the final product.

After the material has been molded to the desired form, either under pressure or without pressure, it is allowed to dry for several days at any suitable temperature. This is preferably accomplished at ordinary room temperature although a higher or lower temperature may be used.

After the material has set for a sufficient length of time a strong bond is produced between the various particles of the composition which, it is believed, may be due to a reaction between the ingredients of the composition. The molded object, after the above treatment, is immersed in concentrated hydrochloric acid for a sufficient length of time to cause a separation of silicic acid from sodium silicate within the pores of the material, the objects being allowed to remain in the acid from about five to ten hours, although a shorter or longer time may be employed, depending on the size of the objects, the strength of the acid, and other considerations as will be apparent to those skilled in the art. It is not definitely known what reaction takes place through this treatment, although it appears that silicic acid is separated out in the process and is distributed through the pores of the material. After the acid treatment the object is washed to remove the remaining acid.

If desired the excess acid adhering to the object may be removed by a preliminary treatment with water and, thereafter, the remainder of the acid may be neutralized with ammonia, which is preferably employed in a pure concentrated form. The ammonia, or ammonium hydroxide reacts with the hydrochloric acid present to form ammonium chloride, which may be readily washed out, but does not react with the separated silicic acid. If ammonia is employed in the process the soluble salts which are formed are preferably removed by washing the object in running water for a period of not less than twelve hours, the time of treatment being, of course, dependent upon the nature and size of the object.

After the object has been treated for a sufficient length of time in the water, as may be determined by testing a sample of the water in contact therewith by means of indicators or other chemical tests to determine the point at which the water soluble material has been removed, the object is dried, either in the air or in an oven.

After the treatment with water, the silicic acid, which has been introduced into the object and liberated within the pores thereof from sodium silicate is apparently in an amorphous form. The exact form in which the silicic acid exists in my new composition of matter is not known entirely for the reason that there are many different hydrated forms of silicic acid, which in combination with other material are extremely difficult to identify, or which it is substantially impossible to separate without changing their composition.

It is well known that the ortho-silicic acid $Si(OH)_4$ breaks down by liberation of water into the metasilicic acid, $H_2SiO_3$, and into disilicic acids, such as $H_2Si_2O_5$, for example, and further to trisilicic acid $H_4Si_3O_8$. It seems probable that in my composition several of these various forms are present and act as a binding material.

I find that my product has very valuable properties which are not present in the original fused silica employed. Fused silica, for example, has a limited field of use on account of the difficulty involved in forming the various desired shapes while in the state of fusion, and only simple forms can be made on a commercial scale.

I have found, however, that by using the method above described a material is obtained which has substantially the same low coefficient of expansion and high chemical resistance as fused silica or fused quartz, and has the additional advantage that it may be molded into substantially any desired shape and is adapted, therefore, for the production of insulating members, apparatus of complicated forms, and for other uses for which fused quartz is unsuited.

If a colored material is desired, or for any other purpose, I may incorporate a filling material or add other inert material which will not interfere with the particular use to which the object is to be put. I may also, if desired, produce a surface glaze on the material, thus increasing its tensile strength, as by incipient surface fusion, for example, which may be attained by subjecting the body to a sufficient degree of heat, or I may impregnate the product with any suitable material such as paraffin or other medium which is adapted to enter the pores of the product, or I may cover the surface of the object with varnish or other insulating material to suitably modify the appearance of the product, and to adapt it to other uses, such as radio apparatus for example.

It is to be understood that I do not desire to be limited as to the form of the silicic acid in my product which may be either in the hydrated or substantially dehydrated form. It is to be understood, furthermore, that various changes and modifications may be made in the product and the method above described without departing from the spirit and scope of the invention as defined in the claims.

Having thus described the invention, what is claimed as new is:

1. An article of manufacture comprising comminuted fused silica and silicic acid.

2. A composition of matter comprising a molded mixture of fused silica and silicic acid in combination therewith.

3. An article of manufacture comprising fused silica and hydrated silica combined therewith as a cementing medium.

4. An article of manufacture comprising fused silica and a cementing medium obtained by admixing with fused silica an alkaline silicate solution to form a paste, molding the said paste, treating with a strong acid, and drying the mass.

5. An article of manufacture comprising the resultant product obtained by treatment of comminuted fused silica with sodium silicate to form a paste therefrom, molding the said paste to the desire form, treating the molded mass with concentrated hydrochloric acid to liberate silica from the said silicate, removing the excess of hydrochloric acid, thereafter treating the molded mass with ammonia, washing out the soluble salts therefrom with water, and drying the molded mass.

6. A process for the utilization of waste fused silica which comprises comminuting fused silica, adding a soluble silicate thereto to form a paste, molding the product thereof, treating the said product with a strong acid to liberate silicic acid from the said soluble silicate within the body of the said molded product and thereafter removing the said acid and drying the product.

7. A process for the utilization of waste fused silica which comprises comminuting fused silica, mixing a sodium silicate solution therewith to form a paste, molding the paste into a body of the desired form, drying the molded body, treating the said body with a concentrated hydrochloric acid solution for a sufficient time to attain the desired reaction, removing the excess of acid from the said body, treating the said body with ammonia, washing the said body with water for a sufficient time to remove soluble salts from the said body, and finally drying the said body.

Signed at New York city, N. Y., this 4th day of May, 1925.

WILLIAM W. WINSHIP.